(12) United States Patent
Mishra

(10) Patent No.: US 7,457,788 B2
(45) Date of Patent: Nov. 25, 2008

(54) REDUCING NUMBER OF COMPUTATIONS IN A NEURAL NETWORK MODELING SEVERAL DATA SETS

(75) Inventor: Amulya Mishra, Jharsuguda District (IN)

(73) Assignee: Oracle International Corporation, Redwood Shores, CA (US)

( * ) Notice: Subject to any disclaimer, the term of this patent is extended or adjusted under 35 U.S.C. 154(b) by 519 days.

(21) Appl. No.: 10/709,970

(22) Filed: Jun. 10, 2004

(65) Prior Publication Data

US 2005/0278269 A1    Dec. 15, 2005

(51) Int. Cl.
*G06E 1/00*  (2006.01)
*G06E 3/00*  (2006.01)

(52) U.S. Cl. ............................... 706/15; 706/19; 706/25

(58) Field of Classification Search ............... 706/15, 706/19, 25; 703/2, 6
See application file for complete search history.

(56) References Cited

U.S. PATENT DOCUMENTS

| | | | |
|---|---|---|---|
| 5,809,490 A * | 9/1998 | Guiver et al. ................. | 706/16 |
| 6,295,635 B1 * | 9/2001 | Dhaene et al. ................ | 716/14 |
| 6,542,249 B1 * | 4/2003 | Kofman et al. ............... | 356/601 |
| 6,961,719 B1 * | 11/2005 | Rai .............................. | 706/21 |
| 2003/0225659 A1 * | 12/2003 | Breeden et al. ............... | 705/36 |
| 2004/0093315 A1 * | 5/2004 | Carney ........................ | 706/15 |

OTHER PUBLICATIONS

Prof. Leslie Smith, "An Introduction to Neural Networks", Downloaded from http://www.cs.stir.ac.uk/~lss/NNIntro/InvSlides.html; pp. 1-10; Oct. 25, 1996; Department of Computing and Mathematics, University of Stirling.

* cited by examiner

*Primary Examiner*—David Vincent
*Assistant Examiner*—Adrian L Kennedy
(74) *Attorney, Agent, or Firm*—Narendra Reddy Thappeta

(57) ABSTRACT

An approach that enables reducing the number of computations while modeling data sets using a neural network. To model a first system characterized by a data set, a determination is made as to whether the data elements of the data set follow a similar pattern as data elements of another data set. If such an another data set exists, the weights determined with a system associated with the another data set, are used as initial weights while modeling the first system. Due to such a feature, number of computations in a neural network can be reduced while modeling several data sets.

18 Claims, 5 Drawing Sheets

REDUCING NUMBER OF COMPUTATIONS IN A NEURAL NETWORK MODELING SEVERAL DATA SETS

BACKGROUND OF INVENTION

A typical neural network contains 'neurons', which are connected by 'weights'. Weights generally serve to communicate the results/conclusions reached by one neuron to other neurons. The weights are adjusted while examining a data set until the neural network models the system consistent with the data set (within an acceptable error level). In the share price example above, the weights of the neural network and the operation of neurons are adjusted until the share price of each day (in a data set) is predicted based on the price of the prior days (in the data set).

A prior neural network may be designed to start with random values for weights, and adjust the values iteratively while examining each data set. Various approaches may be used for such adjustment and example approaches are described in a document entitled, "An Introduction to Neural Networks", available at the URL: http://www.cs.stir.ac.uk/~lss/NNIntro/InvSlides.html.

One problem with starting with random weights for each system is that it may require a large number of iterations to determine weights, which would model a system at a desired level of accuracy. The resulting required large number of computations and large amount of time may be unacceptable in several environments. Accordingly, there is a general need to reduce the number of computations while modeling systems using neural networks.

BRIEF DESCRIPTION OF DRAWINGS

The present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

An aspect of the present invention reduces the number of computations required to model a system characterized by a data set. To achieve such a reduction, a system checks whether there exists another system, which has been already modeled as a neural network and data set characterizing the another system follows a similar pattern as the data set characterizing the system sought to be modeled. If such an another system exists, the weights computed for the another system are used as the initial weights for the system sought to be modeled.

Due to such initial weights, the final weight values for the system sought to be modeled may be computed in a fewer number of iterations (compared to a prior approach in which the weights are initialized to random values). Accordingly, the computational requirements may be reduced at least in some cases.

In an embodiment, similarity of data sets is checked by using a "curve fitting" technique to fit each data set into a respective polynomial, and using least square method to determine the distance between the two data sets. If the distance is less than a threshold (which can be either pre-computed or determined dynamically), data sets may be deemed to be of similar pattern.

According to another aspect of the present invention, weights corresponding to pre-modeled data sets are stored in a data storage (such as database). The weights may thus be retrieved and used as initial weights for systems sought to be characterized later. The data sets and/or computed polynomials (in general, data characterizing the prior behavior of the system) may also be stored, which enables checking of similarity of patterns of data sets.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Sample Neural Network

Figure 1:
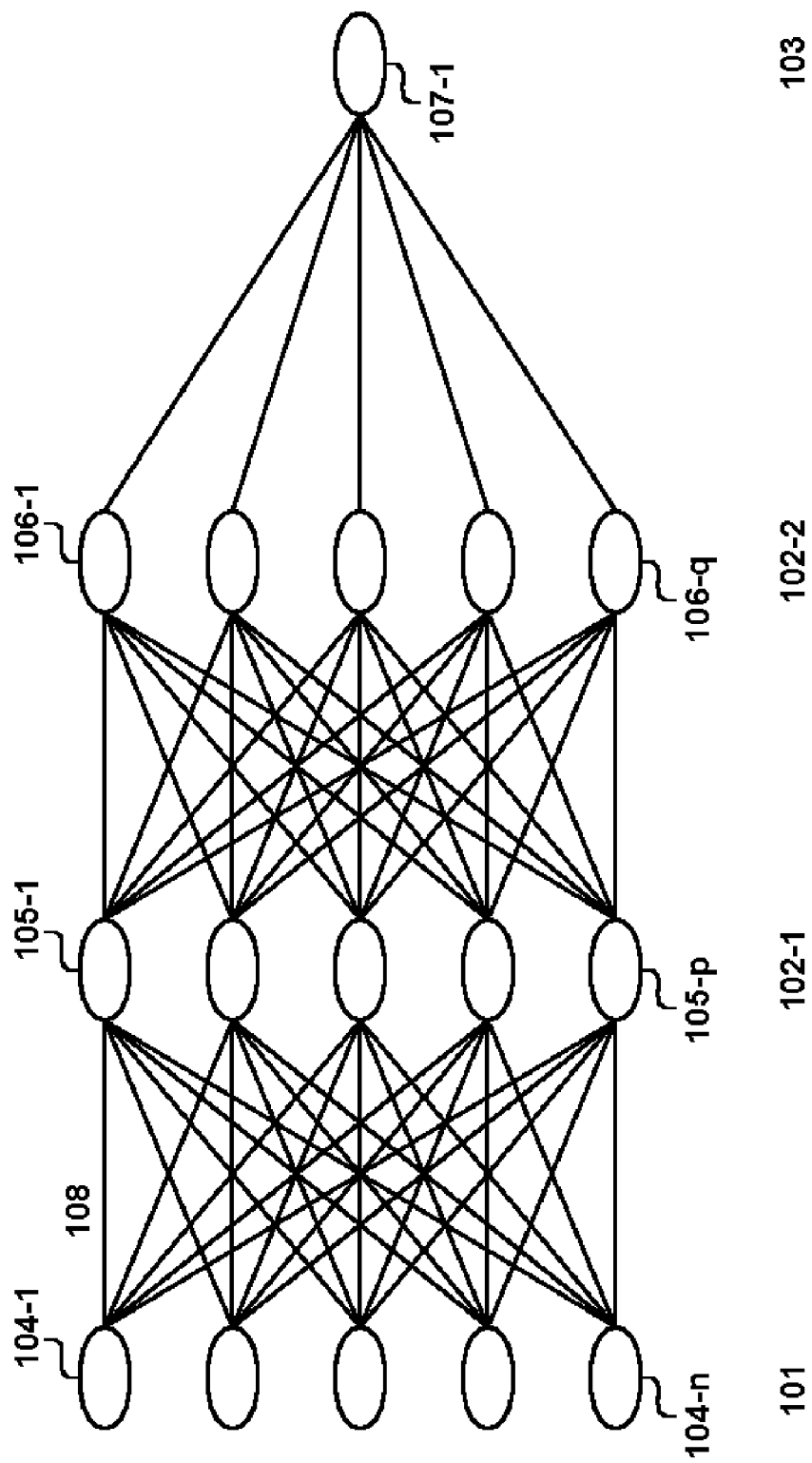
FIG. 1 is a diagram depicting the various elements of an example neural network

FIG. 1 is a diagram illustrating the details of an example neural network in which various aspects of the present invention can be implemented. The neural network is shown containing four layers namely input layer 101, hidden layers 102-1 and 102-2, and output layer 103. Each layer and the corresponding components are described below in detail.

Input layer 101 is shown containing neurons 104-1 through 104-n. Each neuron 104-1 through 104-n may receive one or more elements of a data set, and process the corresponding elements to generate one or more weights. The weights are shown communicated to the neurons in the next layer (102-1) as represented by the lines below reference numeral 108.

Hidden layer 102-1 is shown containing neurons 105-1 to 105-p, which are shown receiving weights from input layer 101, and generating weights for the subsequent layer 102-2. Similarly, hidden layer 102-2 is shown containing neurons 106-1 through 106-Q, which receive weights from prior layers and generate corresponding weights.

Output layer 103 may also contain one or more neurons, which operate according to the weights received from the prior layer to generate the desired outputs.

From the above, it may be appreciated that each neuron operates based on the weights received from various other neurons. In general, the weights are sought to be adjusted using various approaches until the neural network appropriately models the prior data points. The models thus generated can be used, for example, to predict future results.

As noted above, a prior approach may start with random values for weights while modeling each system, which may lead to a large number of iterations. The description is continued with an illustration of an example implementation of a neural network according to various aspects of the present invention, which reduces such large number of iterations at least in some cases.

3. Example Implementation

Figure 2:
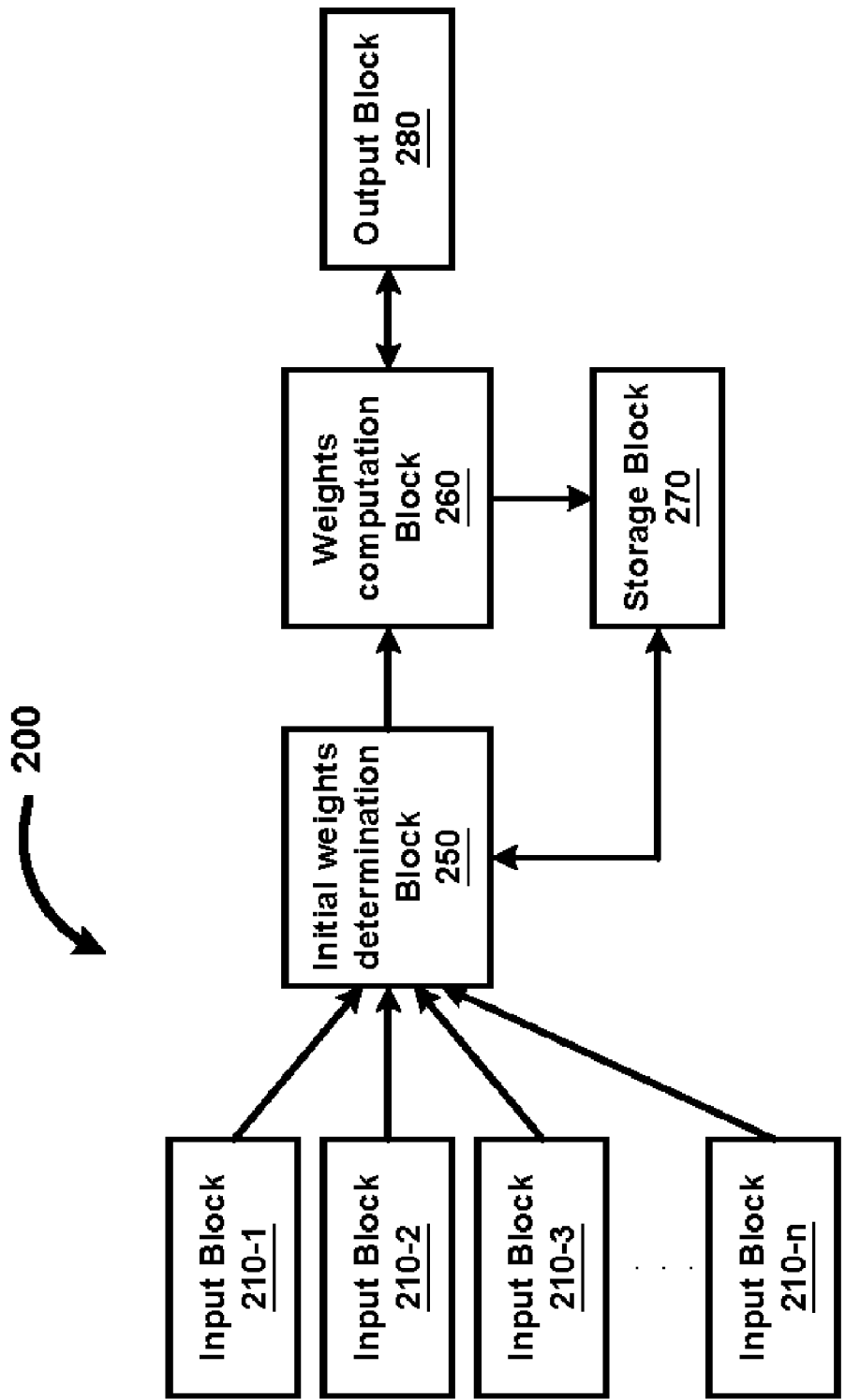
FIG. 2 is a block diagram illustrating the details of an approach to implementing a neural network according to various aspects of the present invention.

FIG. 2 is a block diagram representing a logical view in which a neural network may be implemented according to various aspects of the present invention. Neural network 200 of FIG. 2 is shown containing input blocks 210-1 to 210-n, initial weights determination block 250, weights computation block 260, storage block 270 and output block 280. Each block is described below in further detail.

Each of input blocks 210-1 to 210-n may receive one or more data elements (e.g., the daily closing stock share prices when the stock price is sought to be modeled on a daily basis) of a data set sought to be modeled. Each data element can be represented in various forms, e.g., vectors, polar coordinates, as appropriate for the specific system. The received data elements may be forwarded to initial weights determination block 250.

Output block 280 receives the weights for a present iteration and the data elements based on which the output values are to be generated, computes the corresponding outputs, and provides the computed outputs to weights computation block 260. The weights and data elements may be received from weights computation block 260.

Weights computation block 260 determines the weights of the neural network for each successive iteration based on the output values received from output block 280. The weights to be used in a first iteration may be received from initial weights determination block 250. Weights computation block 260 may provide the determined weights and the specific data elements to be used in computing the output values for a present iteration to output block 280.

The weights may be adjusted using various techniques well known in the relevant arts by comparing the received output values with the expected output values. The weights are adjusted until the data set is modeled within a desired degree of accuracy.

The final weights thus computed to model the received data set may be stored in storage block 270. Storage block 270 may contain non-volatile storage (data storage) for storing the final computed weights as well as the data sets and/or computed polynomials (in general, data characterizing the behavior of the system).

Initial weights determination block 250 provides initials weights to be used in a first iteration. The initial weights thus provided may lead to reduced number of iterations or computations in weights computation block 260. The manner in which the initial weights may be determined according to an aspect of the present invention is described below with reference to FIG. 3.

4. Method

Figure 3:
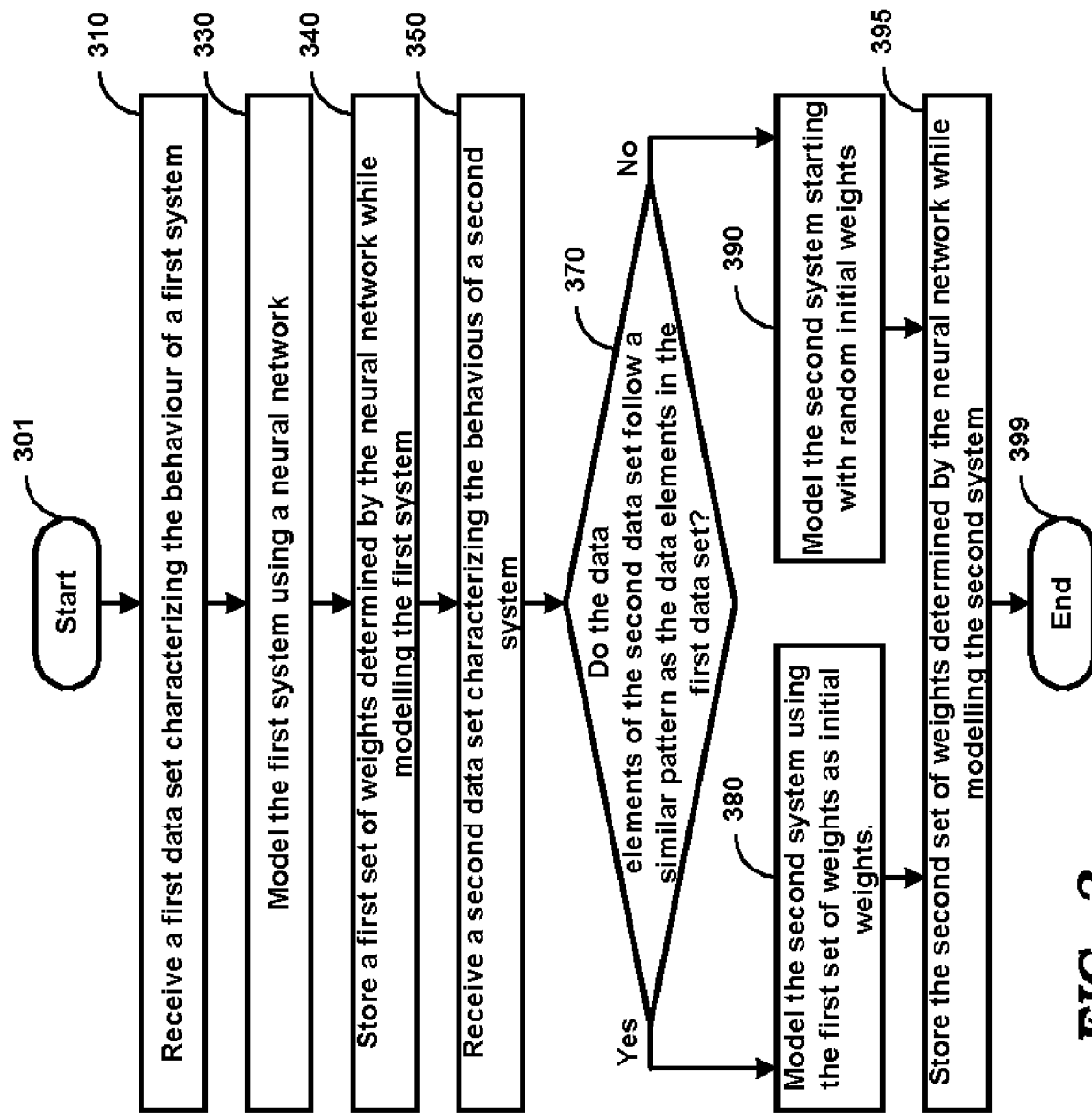
FIG. 3 is a flow chart illustrating the manner in which the initial weights of a neural network may be determined according to an aspect of the present invention.

FIG. 3 is a flow chart illustrating the manner in which the initial weights of a neural network may be determined according to various aspects of the present invention. The flow chart is described with reference to FIG. 2 merely for illustration. The flow chart begins in step 301 and control immediately passes to step 310.

In step 310, input blocks 210-1 through 210-n receive a first data set characterizing the behavior of a first system to be modeled. The data set may contain one or more data elements, as noted above.

In step 330, neural network 200 (or weight computation block 250 and output block 280 together) models the first system based on the data elements contained in the first data set. Such modeling may be performed using any of prior approaches as well as various aspects of the present invention. A first set of weights may be determined due to such modeling.

In step 340, weights computation block 260 stores the first set of weights in storage block 270. In addition, the first data set or any other data (e.g., the coefficients of polynomials, described below with reference to FIG. 4) characterizing the behavior of the first system may also be stored.

In step 350, input blocks 210-1 through 210-n receive a second data set characterizing a second system sought to be modeled. The second data set may also contain multiple data elements.

In step 370, initial weight determination block 250 may determine if the data elements in the second data set follow a similar pattern as the data elements in the first data set. An example approach to determine such similarity is described below with reference to FIG. 4. However, other approaches can be used to determine similarity. Control passes to step 380 if a similarity is detected, and to step 390 otherwise.

In step 380, neural network 200 models the second data set using the first set of weights as initial weights. Due to such use of first set of weights, the number of computations required for step 380 may be reduced (in comparison with a prior approach when only random weights are used as initial weights). Control then passes to step 395.

In step 390, neural network 200 models the second data set starting with random initial weights (or other values determined using other approaches). Control then passes to step 395.

In step 395, weights determined corresponding to the second data set may also be stored in storage block 270. Data characterizing the behavior of the second system may also be stored in storage block 270. The stored information may be used again in steps 370 and 380, as appropriate, while modeling additional systems to reduce the computational requirements. The method ends at step 399.

While the above approach(es) are described with reference to only two data sets merely for illustration, it should be understood that the approaches can be easily extended to use many data sets/systems over time. The description is continued with respect to the manner in which a determination can be made as to whether two data sets follow a similar pattern.

5. Determining Whether Data Sets Follow a Similar Pattern

Figure 4:
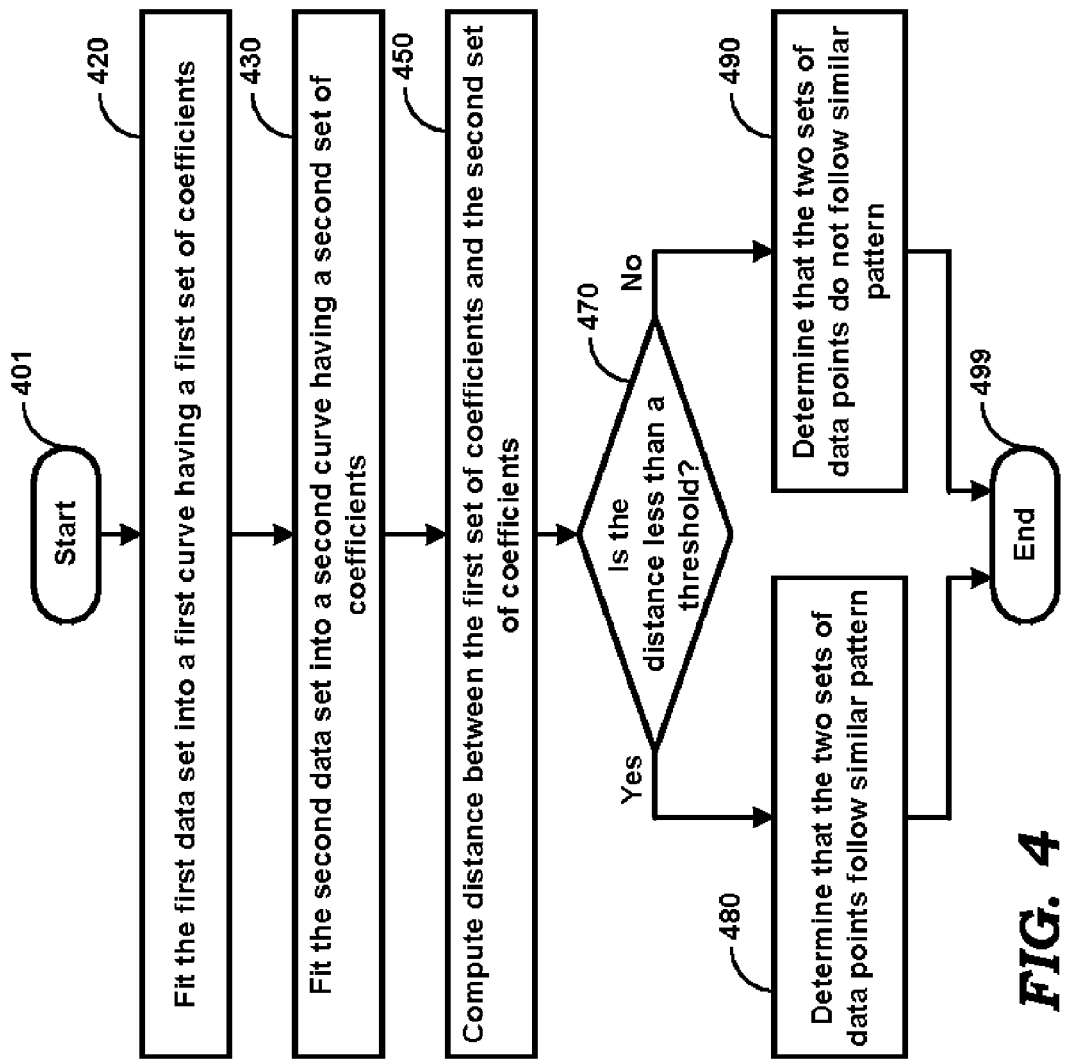
FIG. 4 is a flow chart illustrating the manner in which a determination can be made as to whether two data sets follow similar pattern, in one embodiment.

FIG. 4 is a flow chart illustrating the manner in which a determination can be made as to whether two data sets follow similar pattern, in one embodiment. The flow chart of FIG. 4 begins at step 401 and control immediately passes to step 420.

In step 420, initial weight determination block 250 fits the first data set into a first curve having a first set of coefficients. For ease of comparison (in step 470), the data elements may be normalized to a pre-specifed range (e.g., 0 to 1 on a linear scale), and the normalized data elements may be fit into a curve. Such curve fitting may be performed in a known way.

In one embodiment, curve fitting is performed using 'Least Square Method' technique, which helps in ascertaining the line or curve of "best" fit for a set of data points. According to this technique, data points are plotted on a graph and a smooth line is drawn through the midst of them and a distance of each point from a corresponding point on the line/curve may be computed as difference between the observed and predicted results.

The line/curve of best fit is that for which the average of squares of these distances is least (or within an acceptable error limit). For illustration, it is assumed that the first data set is fit into a cubical function of $(a1x^3+b1x^2+c1x+d1)$, wherein $a1$, $b1$, $c1$ and $d1$ represent the coefficients.

In step 430, initial weight determination block 250 fits the second data set (or normalized data element values) also into a second curve. For illustration, it is assumed that the second data set is fit into a cubical function of $(a2x^3+b2x^2+c2x+d2)$, wherein a2, b2, c2 and d2 represent the coefficients for the second cubical function.

In step 450, the distance between the first set of coefficients and the second set of coefficients is computed. In the illustrative example, the distance may be computed using a formula $(sqrt((a2-a1)^2+(b2-b1)^2+(c2-cb1)^2+(d2-d1)^2))$. Instead of normalizing the data elements of the data sets, in an alternative embodiment, the coefficients may be normalized prior to computation of the distance.

In step 470, initial weight determination block 250 determines if the distance is less than a threshold value. If the distance is less than the threshold value, control transfers to step 480 else to step 490.

In step 480, initial weight determination block 250 determines that the two sets of data points follow similar pattern, and control passes to step 499. In step 490, initial weight determination block 250 determines that the two sets of data points do not follow similar pattern, and control passes to step 499. The method ends at step 499.

The features described above may be attained by appropriate design/implementation of software instructions executing on a digital processing system, as described below in further detail.

6. Software-Driven Implementation

Figure 5:
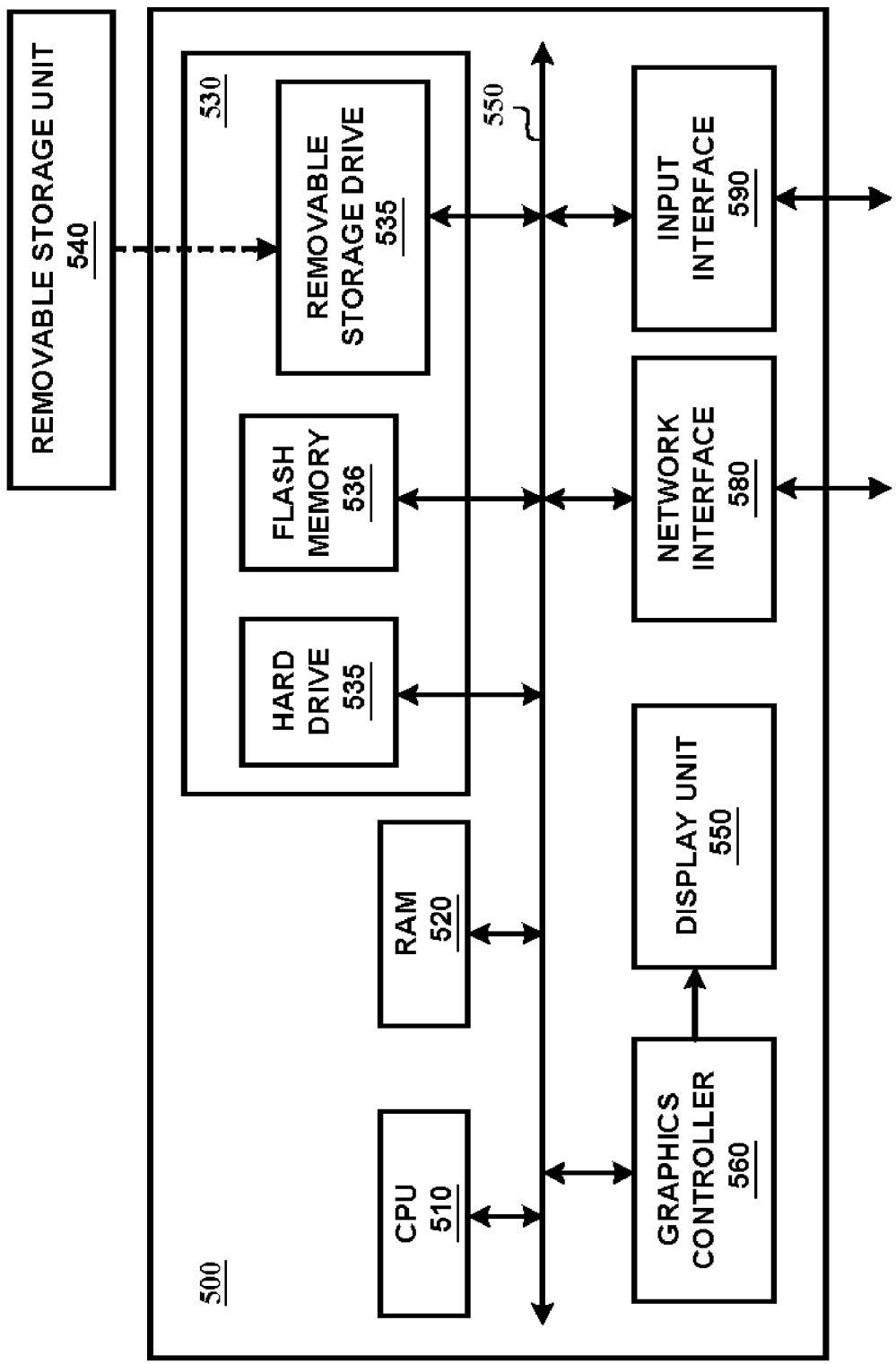
FIG. 5 is a block diagram illustrating the details of an example embodiment implementing various aspects of the present invention in the form of software instructions.

FIG. 5 is a block diagram illustrating the details of how various aspects of the invention may be implemented substantially in the form of software in an embodiment of the present invention. System 500 may contain one or more processors such as central processing unit (CPU) 510, random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present invention. For example, determination of initial weight and modeling of systems using neural network, may be performed due to such execution. CPU 510 may contain multiple processing units, with each processing unit potentially being designed for a specific task. Alternatively, CPU 510 may contain only a single general purpose-processing unit. RAM 520 may receive instructions from secondary memory 530 using communication path 550.

Graphics controller 560 generates display signals (e.g., in RGB format) to display unit 570 based on data/instructions received from CPU 510. Display unit 570 contains a display screen to display the images defined by the display signals. Input interface 590 may correspond to a keyboard and/or mouse. Graphics controller 560 and input interface 590 may enable a user to interact directly with system 500.

Secondary memory 530 may contain hard drive 535, flash memory 536 and removable storage drive 537. Secondary memory 530 may store the data and software instructions, which enable system 500 to provide several features in accordance with the present invention. Some or all of the data and instructions may be provided on removable storage unit 540, and the data and instructions may be read and provided by removable storage drive 537 to CPU 510. Floppy drive, magnetic tape drive, CD-ROM drive, DVD Drive, Flash memory, removable memory chip (PCMCIA Card, EPROM) are examples of such removable storage drive 537.

Removable storage unit 540 may be implemented using medium and storage format compatible with removable storage drive 537 such that removable storage drive 537 can read the data and instructions. Thus, removable storage unit 540 includes a computer readable storage medium having stored therein computer software and/or data.

In this document, the term "computer program product" is used to generally refer to removable storage unit 540 or hard disk installed in hard drive 535. These computer program products are means for providing software to system 500. CPU 510 may retrieve the software instructions, and execute the instructions to provide various features of the present invention as described above.

7. Conclusion

While various embodiments of the present invention have been described above, it should be understood that they have been presented by way of example only, and not limitation. Thus, the breadth and scope of the present invention should not be limited by any of the above-described example embodiments, but should be defined only in accordance with the following claims and their equivalents.

The invention claimed is:

1. A method of reducing number of computations when modeling several systems using a neural network, wherein said neural network contains a plurality of neurons, wherein each system is modeled by starting with a corresponding plurality of initial weights for said plurality of neurons and performing computations iteratively to re-compute weights of at least one of said neurons until a pre-specified condition is obtained, wherein the weights of said neurons when said pre-specified condition is obtained represents a set of final weights modeling the system, said method comprising:

receiving a first data set characterizing the behavior of a first system which has not been previously modeled, said first data set containing a first plurality of data elements;

modeling said first system based on said first data set using said neural network, wherein a first set of weights are generated by said modeling said first system, wherein said first set of weights corresponds to the set of final weights associated with said plurality of neurons modeling said first system;

receiving a second data set characterizing the behavior of a second system which is distinct from said first system, has not been previously modeled and is sought to be modeled by said neural network, said second data set containing a second plurality of data elements;

determining whether said first plurality of data elements follow a similar pattern as said second plurality of data elements; and modeling said second system based on said second data set using said neural network to generate a second set of weights as the set of final weights for said second system, wherein the final set of weights of said previously modeled first system are used as initial weights for said plurality of neurons while modeling said second system if said first plurality of data elements follow a similar pattern as said second plurality of data elements, wherein using the final set of weights of said previously modeling first initial weights to model said second system reduces the number of computations in modeling said second system.

2. The method of claim 1, further comprising storing said first set of weights in a non-volatile storage.

3. The method of claim 1, wherein random values are used as initial weights for said plurality of neurons while modeling said second system if said first plurality of data elements do not follow a similar pattern as said second plurality of data elements.

4. The method of claim 1, wherein said determining comprises:
   fitting said first data set into a first curve, wherein said first curve is represented in the form of a first polynomial function having a first set of coefficients;
   fitting said second data set into a second curve, wherein said second curve is represented in the form of a second polynomial function having a second set of coefficients;
   computing a distance between said first set of coefficients and said second set of coefficients; and
   checking whether said distance is less than a threshold, wherein said first plurality of data elements are determined to follow a similar pattern as said second plurality of data elements if said distance is less than said threshold.

5. The method of claim 4, wherein each of said first plurality of data elements and said second plurality of data elements is normalized to a pre-specified range prior to said fitting.

6. The method of claim 4, wherein each of said first set of coefficients and said second set of coefficients is normalized to a pre-specified range prior to said computing.

7. The method of claim 4, wherein each of said first data set and said second data set comprises stock share prices of corresponding stocks.

8. A computer readable medium carrying one or more sequences of instructions causing a digital processing system reduce number of computations in a neural network modeling several data sets, wherein said neural network contains a plurality of neurons, wherein each system is characterized by a corresponding data set containing data elements and expected values, and is modeled by starting with a corresponding plurality of initial weights for said plurality of neurons and iteratively computing weights of said neurons until said plurality of neurons with associated set of final weights causes said neural network to provide output values within a desired degree of accuracy compared to expected output values, wherein execution of said one or more sequences of instructions by one or more processors contained in said digital processing system causes said one or more processors to perform the actions of:
   receiving a first data set and a first set of expected output values characterizing the behavior of a first system which has not been previously modeled, said first data set containing a first plurality of data elements;
   modeling said first system based on said first data set using said neural network such that said neural network generates output values with a corresponding desired degree of accuracy compared to said first set of expected output values in response to receiving said first plurality of data elements, wherein a first set of weights are generated by said modeling said first system, wherein said first set of weights corresponds to the set of final weights associated with said plurality of neurons modeling said first system;
   receiving a second data set and a second set of expected output values characterizing the behavior of a second system which is distinct from said first system, has not been previously modeled and is sought to be modeled by said neural network, said second data set containing a second plurality of data elements;
   determining whether said first plurality of data elements follow a similar pattern as said second plurality of data elements; and
   modeling said second system based on said second data set and said second set of expected values using said neural network to generate a second set of weights as the set of final weights for said second system, wherein the final set of weights of said previously modeled first system are used as initial weights for said plurality of neurons while modeling said second system if said first plurality of data elements follow a similar pattern as said second plurality of data elements,
   wherein using the final set of weights of said previously modeled first system as initial weights to model said second system reduces the number of computations in modeling said second system.

9. The computer readable medium of claim 8, further comprising storing said first set of weights in a non-volatile storage.

10. The computer readable medium of claim 8, wherein random values are used as said plurality of initial weights for said plurality of neurons while modeling said second system if said first plurality of data elements do not follow a similar pattern as said second plurality of data elements.

11. The computer readable medium of claim 8, wherein said determining comprises:
   fitting said first data set into a first curve, wherein said first curve is represented in the form of a first polynomial function having a first set of coefficients;
   fitting said second data set into a second curve, wherein said second curve is represented in the form of a second polynomial function having a second set of coefficients;
   computing a distance between said first set of coefficients and said second set of coefficients; and
   checking whether said distance is less than a threshold, wherein said first plurality of data elements are determined to follow a similar pattern as said second plurality of data elements if said distance is less than said threshold.

12. The computer readable medium of claim 11, wherein each of said first data set and said second data set comprises stock share prices of corresponding stocks.

13. An apparatus in a digital processing system said apparatus reducing number of computations when modeling several systems using a neural network, wherein said neural network contains a plurality of neurons, wherein each system is characterized by a corresponding data set containing data elements and expected values, and is modeled by starting with a corresponding plurality of initial weights for said plurality of neurons and performing computations iteratively computing weights of said neurons until said plurality of neurons with associated set of final weights causes said neural network to provide output values within a desired error level, said apparatus comprising:
   means for receiving a first data set and a first set of expected output values characterizing the behavior of a first system which has not been previously modeled, said first data set containing a first plurality of data elements;
   means for modeling said first system based on said first data set using said neural network such that said neural network generates output values with a corresponding desired degree of accuracy compared to said first set of expected output values in response to receiving said first plurality of data elements, wherein a first set of weights are generated by said modeling said first system, wherein said first set of weights corresponds to the set of final weights associated with said plurality of neurons modeling said first system;

means for receiving a second data set and a second set of expected output values characterizing the behavior of a second system which is distinct from said first system, has not been previously modeled and is sought to be modeled by said neural network, said second data set containing a second plurality of data elements;

means for determining whether said first plurality of data elements follow a similar pattern as said second plurality of data elements; and means for modeling said second system based on said second data set and said second set of expected values using said neural network to generate a second set of weights as the set of final weights for said second system, wherein the final set of weights of said previously modeled first system are used as initial weights for said plurality of neurons while modeling said second system if said first plurality of data elements follow a similar pattern as said second plurality of data elements, wherein using the final set of weights of said previously modeled first system as initial weights to model said second system reduces the number of computations in modeling said second system.

14. The apparatus of claim 13, further comprising means for storing said first set of weights in a non-volatile storage.

15. The apparatus of claim 13, wherein random values are used as said plurality of initial weights for said plurality of neurons while modeling said second system if said first plurality of data elements do not follow a similar pattern as said second plurality of data elements.

16. The apparatus of claim 13, wherein said means for determining is operable to:

fit said first data set into a first curve, wherein said first curve is represented in the form of a first polynomial function having a first set of coefficients;

fit said second data set into a second curve, wherein said second curve is represented in the form of a second polynomial function having a second set of coefficients;

compute a distance between said first set of coefficients and said second set of coefficients; and check whether said distance is less than a threshold, wherein said first plurality of data elements are determined to follow a similar pattern as said second plurality of data elements if said distance is less than said threshold.

17. A method of reducing number of computations when modeling several systems using a neural network, said method comprising:

receiving a first data set and a first set of expected values characterizing the behavior of a first system which has not been previously modeled, said first data set containing a first plurality of data elements;

modeling said first system based on said first data set using said neural network such that said neural network generates output values with a corresponding desired degree of accuracy compared to said first set of expected output values in response to receiving said first plurality of data elements, wherein a first set of weights are generated by said modeling said first system;

receiving a second data set and a second set of expected output values characterizing the behavior of a second system which is distinct from said first system and has not been previously modeled, said second data set containing a second plurality of data elements;

determining whether said first plurality of data elements follow a similar pattern as said second plurality of data elements; and modeling said second system based on said second data set and said second set of expected values using said neural network to generate a second set of weights, wherein the final set of weights of said previously modeled first system are used as initial weights for said plurality of neurons while modeling said second system if said first plurality of data elements follow a similar pattern as said second plurality of data elements, wherein random values are used as initial weights while modeling said second system if said first plurality of data elements do not follow a similar pattern as said second plurality of data elements, wherein using the final set of weights of said previously modeled first system as initial weights to model said second system reduces the number of computations in modeling said second system.

18. The method of claim 1, wherein said pre-specified condition is obtained when said plurality of neurons with associated set of final weights causes said neural network to provide output values within a desired error level.

* * * * *

UNITED STATES PATENT AND TRADEMARK OFFICE
CERTIFICATE OF CORRECTION

PATENT NO. : 7,457,788 B2  Page 1 of 1
APPLICATION NO. : 10/709970
DATED : November 25, 2008
INVENTOR(S) : Mishra It is certified that error appears in the above-identified patent and that said Letters Patent is hereby corrected as shown below:

In column 1, line 22, delete "~lss/" and insert -- ~Iss/ --, therefor.

In column 4, line 52, delete "pre-specifed" and insert -- pre-specified --, therefor.

In column 6, line 63, in claim 1, delete "modeling first" and insert -- modeled first system as --, therefor.

In column 7, line 2, in claim 3, after "as" insert -- said plurality of --.

Signed and Sealed this

Twentieth Day of April, 2010

David J. Kappos
*Director of the United States Patent and Trademark Office*